us009929624B2

(12) United States Patent
Ikeda

(10) Patent No.: US 9,929,624 B2
(45) Date of Patent: Mar. 27, 2018

(54) BRUSHLESS MOTOR AND WIPER APPARATUS

(71) Applicant: Mitsuba Corporation, Kiryu-shi, Gunma (JP)

(72) Inventor: Hironori Ikeda, Kiryu (JP)

(73) Assignee: Mitsuba Corporation, Kiryu-shi, Gunma (JP)

( * ) Notice: Subject to any disclaimer, the term of this patent is extended or adjusted under 35 U.S.C. 154(b) by 198 days.

(21) Appl. No.: 15/068,739

(22) Filed: Mar. 14, 2016

(65) Prior Publication Data
US 2016/0276899 A1 Sep. 22, 2016

(30) Foreign Application Priority Data

Mar. 19, 2015 (JP) .................. 2015-055761

(51) Int. Cl.
| | |
|---|---|
| *H02K 11/00* | (2016.01) |
| *H02K 7/14* | (2006.01) |
| *H02K 7/116* | (2006.01) |
| *H02K 11/33* | (2016.01) |
| *B60S 1/08* | (2006.01) |
| *H02P 6/08* | (2016.01) |
| *H02P 6/30* | (2016.01) |
| *B60S 1/04* | (2006.01) |
| *B60S 1/16* | (2006.01) |

(52) U.S. Cl.
CPC .................. *H02K 7/14* (2013.01); *B60S 1/08* (2013.01); *B60S 1/0807* (2013.01); *H02K 7/116* (2013.01); *H02K 11/33* (2016.01); *H02P 6/08* (2013.01); *H02P 6/30* (2016.02); *B60S 1/0472* (2013.01); *B60S 1/166* (2013.01)

(58) Field of Classification Search
CPC ...... H02K 11/33; H02K 29/08; H02K 11/215; H02K 5/225; H02K 11/21; H02K 11/38; H02K 2211/03
USPC .................................................. 310/68 B, 71
See application file for complete search history.

(56) References Cited

U.S. PATENT DOCUMENTS

| | | | |
|---|---|---|---|
| 8,816,548 B2 * | 8/2014 | Tomizawa | ............. H02K 11/33 310/67 R |
| 2009/0021091 A1 * | 1/2009 | Shiino | .................. B62D 5/0406 310/71 |

(Continued)

FOREIGN PATENT DOCUMENTS

JP  2013-223317 A  10/2013

*Primary Examiner* — Thanh Lam
(74) *Attorney, Agent, or Firm* — McCormick, Paulding & Huber LLP

(57) ABSTRACT

An object of the present invention is to provide a brushless motor and a wiper apparatus which allow high-precision control of a motor unit, and which can be reduced in size and weight. The first surface (91) of the control board (90) is provided on the same side as the rotating shaft (46) and the output shaft (51) so as to face the sensor magnet (MG1), the first and second Hall ICs (94*a*) and (94*b*) are mounted on the first surface (91). The second surface (92) of the control board (90) is provided on the opposite side from the first surface (91), and the third Hall IC (94*c*) is mounted on the second surface (92), and located between the first and second Hall ICs (94*a*) and (94*b*) so as to face the sensor magnet (MG1). In addition, the MR sensor (95) is mounted on the first surface (91) so as to face the second sensor magnet (MG2).

20 Claims, 11 Drawing Sheets

(56) References Cited

U.S. PATENT DOCUMENTS

| | | | |
|---|---|---|---|
| 2013/0057095 A1* | 3/2013 | Okinaga | H02K 3/522 |
| | | | 310/71 |
| 2013/0099609 A1* | 4/2013 | Ikeno | H02K 29/08 |
| | | | 310/52 |
| 2015/0115755 A1* | 4/2015 | Yamasaki | H02K 5/10 |
| | | | 310/71 |
| 2015/0137636 A1* | 5/2015 | Morimoto | H02K 9/22 |
| | | | 310/71 |

* cited by examiner

BRUSHLESS MOTOR AND WIPER APPARATUS

CROSS-REFERENCE TO RELATED APPLICATION

The present application claims priority from Japanese Patent Application No. 2015-055761 filed on Mar. 19, 2015, the content of which is hereby incorporated by reference into this application.

TECHNICAL FIELD

The present invention relates to a small-sized brushless motor incorporated in a vehicle such as an automotive vehicle, and more particularly to a brushless motor used as a driving source for a wiper apparatus.

BACKGROUND

Conventionally, a motor provided with a speed-reducing mechanism capable of large power output in spite of its small size is adopted as a driving source for a wiper apparatus incorporated in a vehicle such as an automotive vehicle, and improved in its mountability on the vehicle. For suppression of electromagnetic wave propagation to in-vehicle equipment such as a radio, a brushless motor provided with no commutator and brush may be adopted as a motor unit. As described above, by adopting the brushless motor as the motor unit, it is possible to suppress electromagnetic noises, and because of the brushless motor carrying neither commutator nor brush it is possible to realize a reduction of the motor in size and weight.

Such a brushless motor provided with a speed-reducing mechanism is descried, for example, in Japanese Laid-Open Patent Application Publication No. 2013-223317. The brushless wiper motor (simply "brushless motor") descried in Japanese Laid-Open Patent Application Publication No. 2013-223317 includes a motor unit and a speed-reducing mechanism. The motor unit has a rotor and a rotating shaft having a worm gear integrally attached thereto. The worm gear is engaged with a worm wheel of the speed-reducing mechanism, and an output shaft is fixed to the rotation center of the worm wheel.

The rotating shaft is provided with an annular magnet for the rotating shaft which is disposed on the radial outside of the rotating shaft. The output shaft is provided with a disc-shaped magnet for the output shaft which is attached to one end in the axial direction of the output shaft. In a gear housing making up the speed-reducing mechanism, a control board (or simply "board") is disposed so as to face the radial exterior of the rotating shaft and one end in the axial direction of the output shaft. Three Hall ICs facing the magnet for the rotating shaft and one MR sensor facing the magnet for the output shaft are provided on a surface of the control board which faces the rotating shaft and the output shaft.

According to the technique descried in Japanese Patent Application Laid-Open Publication No. 2013-223317 (FIG. 8), three Hall ICs facing the magnet for the rotating shaft are mounted on a surface of the control board which faces the rotating shaft and the output shaft, the Hall ICs being arranged at given intervals along the rotation direction of the rotating shaft. As a result, the distance between two Hall ICs disposed on respective ends in the group of three Hall ICs and the annular magnet for the rotating shaft is different from the distance between one Hall IC disposed in the middle in this group and the annular magnet. Specifically, the distance between two Hall ICs disposed on both ends and the annular magnet for the rotating shaft is relatively large, while the distance between the Hall IC in the middle and the annular magnet is relatively small. Because of this arrangement, for example, the Hall ICs on both ends may fail to detect a magnetic change caused by the rotation of the magnet for the rotating shaft, and this leads to lower detection precision.

In order to determine the distance between each Hall IC and the magnet for the rotating shaft to be the same, such an arrangement may be adopted that sensor boards carrying respective Hall ICs are prepared and set so as to face the magnet for the rotating shaft in its axial direction. In this case, however, it is necessary to prepare both the existing control board and new sensor boards. This poses a problem that the number of components increases to bring difficulty in weight/size reduction.

In addition, in order to reduce the distance between the magnet for the rotating shaft and the Hall ICs on both sides disposed along the rotation direction of the magnet for the rotating shaft, another arrangement may be adopted such that the diameter of the magnet for the rotating shaft is increased to improve its angle detection precision. In this case, however, the magnet for the rotating shaft becomes too close to the Hall IC in the middle, and this leads to problems of difficulty in laying out such components as the rotating shaft, magnet for the rotating shaft, and Hall ICs, and of an increase in size of the motor for ensuring a clearance between the magnet for the rotating shaft and the Hall ICs.

SUMMARY

An object of the present invention is to provide a brushless motor and a wiper apparatus which allow high-precision control of a motor unit, and which can be reduced in size and weight.

In accordance with one aspect of the present invention, there is provided a brushless motor comprising: a motor unit having a rotating element; an output shaft which outputs a torque of the motor to outside thereof; a board having a first surface facing the rotating element and a second surface opposite to the first surface; a control unit mounted on the board, the control unit controlling rotation of the rotating element; a first magnet disposed on radial exterior of the rotating element and having a plurality of magnetic poles arranged along a rotation direction of the rotating element; first and second sensors which are mounted on the first surface, the first and second sensors facing the first magnet and arranged at a given interval along the rotation direction of the rotating element; and a third sensor mounted on the second surface, the third sensor facing the first magnet and disposed between the first sensor and the second sensor.

In accordance with another aspect of the present invention, the control unit may control rotation of the rotating element on the basis of detection values given by the first to third sensors.

In accordance with another aspect of the present invention, the rotating element may have: a pair of bearings; a rotating shaft; and a rotor fixed to the rotating shaft, wherein a worm gear making up a speed-reducing mechanism and the first magnet are arranged between the pair of bearings arranged along an axial direction of the rotating element, an axial dimension of the rotor is determined to be shorter than a distance between the pair of bearings, the motor unit has a stator which generates a driving force to the rotating element, and a driving unit for supplying a driving current to a plurality of coils wound around the stator is mounted on the second surface.

In accordance with another aspect of the present invention, the brushless motor may be applied to a wiper apparatus which causes a wiper to swing.

In accordance with another aspect of the present invention, there is provided a brushless motor comprising: a motor unit having a rotating element; a speed-reducing mechanism which reduces rotating speed of the rotating element; an output shaft which outputs a torque of the speed-reducing mechanism to outside thereof; a board having a first surface facing the rotating element and the output shaft and a second surface opposite to the first surface; a control unit mounted on the board, the control unit controlling rotation of the rotating element; a first magnet disposed on radial exterior of the rotating element and having a plurality of magnetic poles arranged along a rotation direction of the rotating element; a second magnet disposed on one end side of the output shaft in its axial direction and having a plurality of magnetic poles arranged along a rotation direction of the output shaft; first and second sensors which are mounted on the first surface, the first and second sensors facing the first magnet and arranged at a given interval along the rotation direction of the rotating element; a third sensor mounted on the second surface, the third sensor facing the first magnet and disposed between the first sensor and the second sensor; and a fourth sensor mounted on the first surface and facing the second magnet.

In accordance with another aspect of the present invention, the control unit may control rotation of the rotating element, based on detection values given by the first to fourth sensors.

In accordance with another aspect of the present invention, the rotating element may have a pair of bearings, and a worm gear making up the speed-reducing mechanism and the first magnet are arranged between the pair of bearings arranged along an axial direction of the rotating element.

In accordance with another aspect of the present invention, the rotating element may have a rotating shaft and a rotor fixed to the rotating shaft, and an axial dimension of the rotor may be determined to be shorter than a distance between the pair of bearings.

In accordance with another aspect of the present invention, the motor unit may have a stator which generates a driving force to the rotating element, and a driving unit for supplying a driving current to a plurality of coils wound around the stator may be mounted on the second surface.

In accordance with another aspect of the present invention, each of the first to third sensors may be a Hall element.

In accordance with another aspect of the present invention, there is provided a wiper apparatus comprising a brushless motor which causes a wiper to swing, wherein the brushless motor includes: a motor unit having a rotating element; a speed-reducing mechanism which reduces rotating speed of the rotating element; an output shaft which outputs a torque of the speed-reducing mechanism to outside thereof; a board having a first surface facing the rotating element and the output shaft and a second surface opposite to the first surface; a control unit mounted on the board, the control unit controlling rotation of the rotating element; a first magnet disposed on radial exterior of the rotating element and having a plurality of magnetic poles arranged along a rotation direction of the rotating element; a second magnet disposed on one end side of the output shaft in its axial direction and having a plurality of magnetic poles arranged along a rotation direction of the output shaft; first and second sensors which are mounted on the first surface, the first and second sensors facing the first magnet and arranged at a given interval along the rotation direction of the rotating element; a third sensor mounted on the second surface, the third sensor facing the first magnet and disposed between the first sensor and the second sensor; and a fourth sensor mounted on the first surface and facing the second magnet.

In accordance with another aspect of the present invention, the wiper may be fixed to the output shaft.

In accordance with another aspect of the present invention, a link mechanism may be disposed between the output shaft and the wiper.

According to the present invention, a first surface of a board faces a rotor and an output shaft, and first and second sensors facing a first magnet are mounted on the first surface and arranged at a given interval along the rotation direction of a rotor. A second surface of the board is opposite to the first surface, and a third sensor facing the first magnet is mounted on the second surface and disposed between the first sensor and the second sensor. In addition, a fourth sensor facing the second magnet is mounted on the first surface. In this configuration, the distance between the first sensor and the first magnet, the distance between the second sensor and the first magnet, and the distance between the third sensor and the first magnet are determined to be substantially the same. This allows a motor unit to be controlled with high precision.

Since the first and fourth sensors are mounted on the same single board, there is no need to prepare sensor boards each carrying one of the first to third sensors. An increase in the number of components is, therefore, suppressed.

By mounting the third sensor on the second surface, it is possible to form a space between the first sensor and the second sensor on the first surface. This space can be used to increase the diameter of the first magnet. In addition, the space can be used to bring the first magnet closer to the first surface of the board without increasing the diameter of the first magnet. This structure reduces the distance between the first magnet and the first and second sensors, thereby improving the angle detection precision and allowing a reduction in size and weight of a brushless motor.

The board is interposed between the first and second sensors and the third sensor. This provides a configuration in which the distance between the first magnet and each sensor facing the curved surface of the first magnet can be adjusted easily without increasing the number of components.

DETAILED DESCRIPTION

Hereinafter, a first embodiment of the present invention will be described in detail with reference to the drawings.

Figure 1:
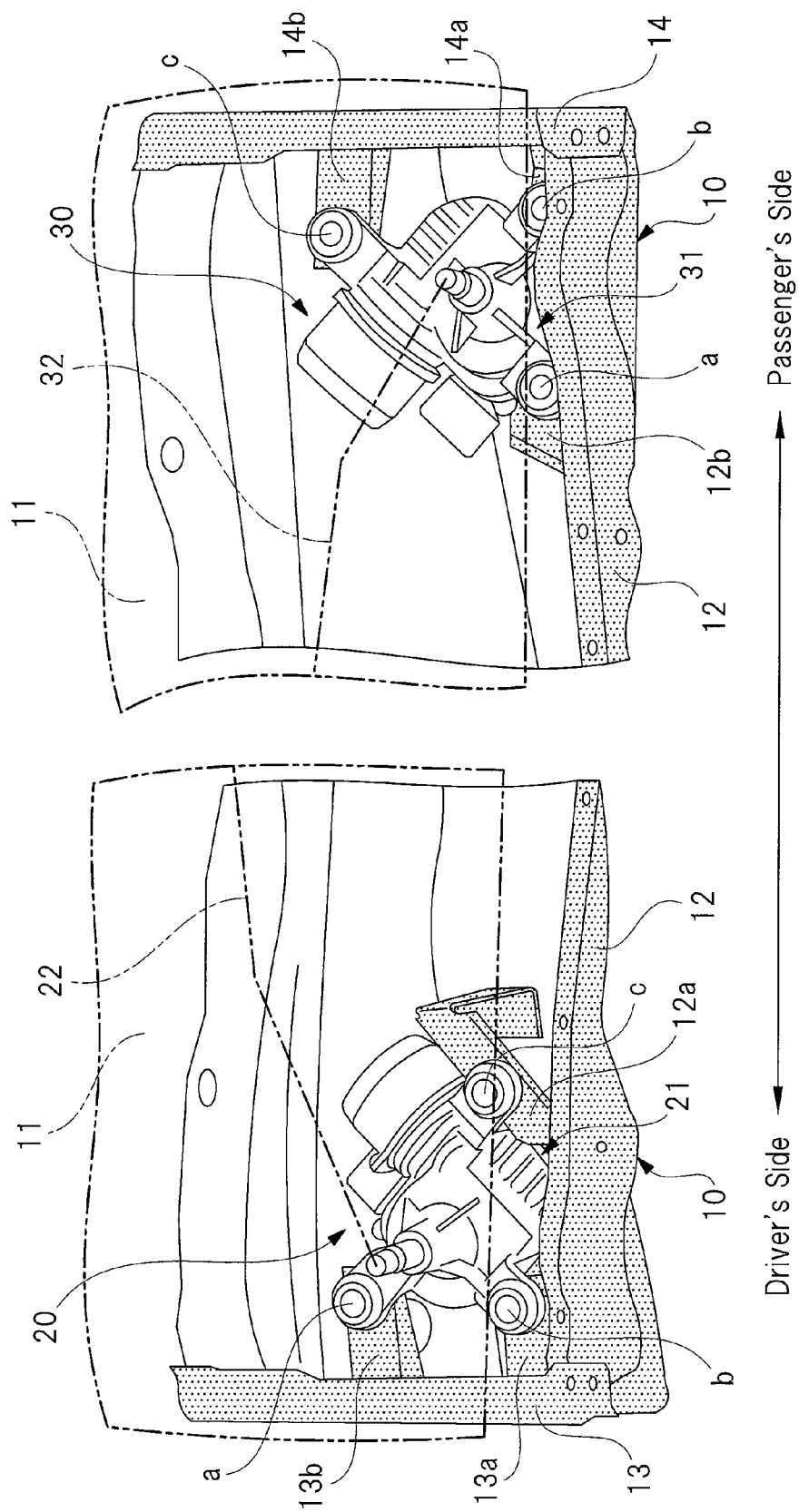
FIG. 1 shows a mounted state of a wiper apparatus of the present invention on a vehicle body.
Figure 2:
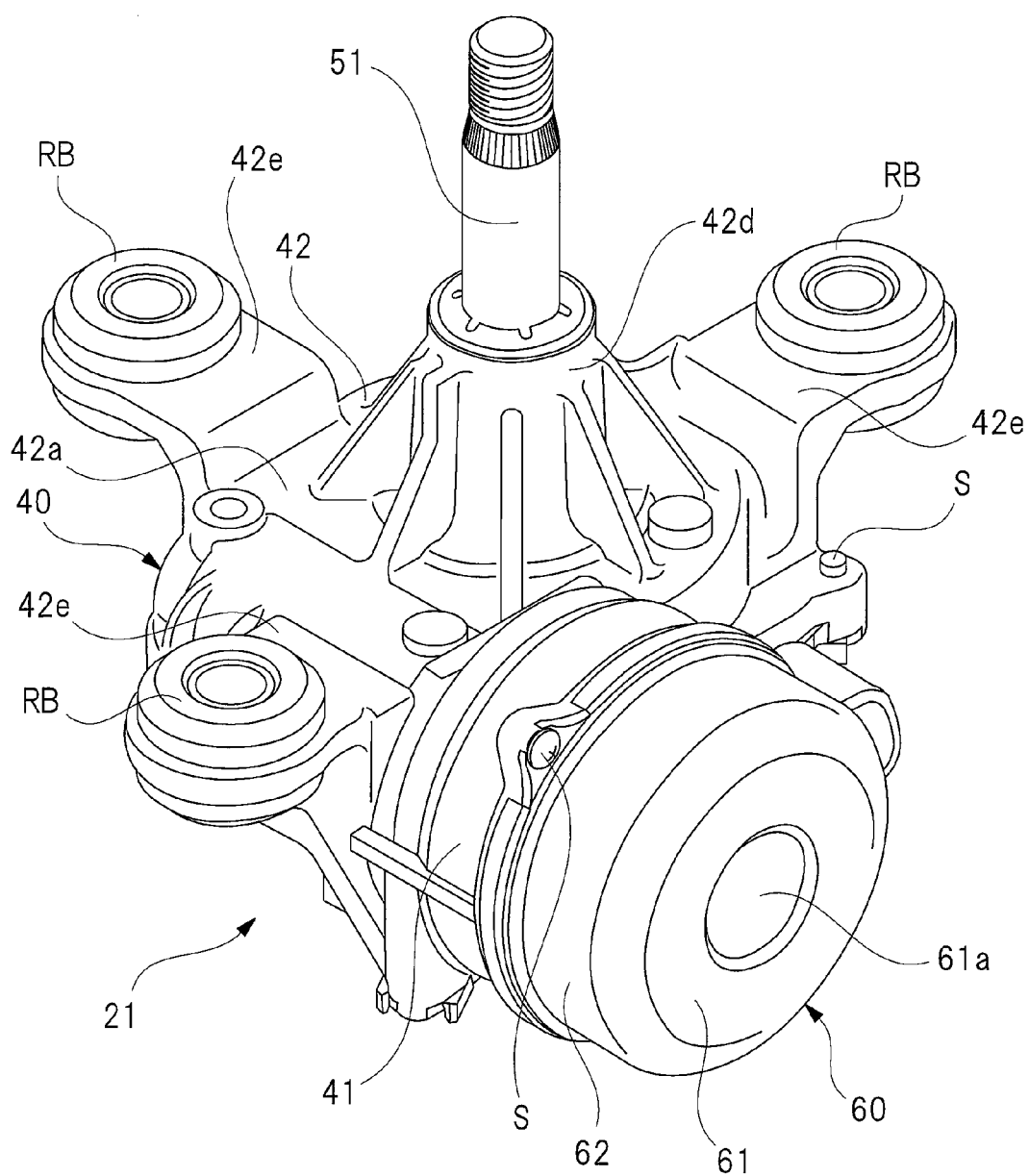
FIG. 2 is a perspective view of a DR-side wiper motor of FIG. 1 which is observed from an output shaft side.
Figure 3:
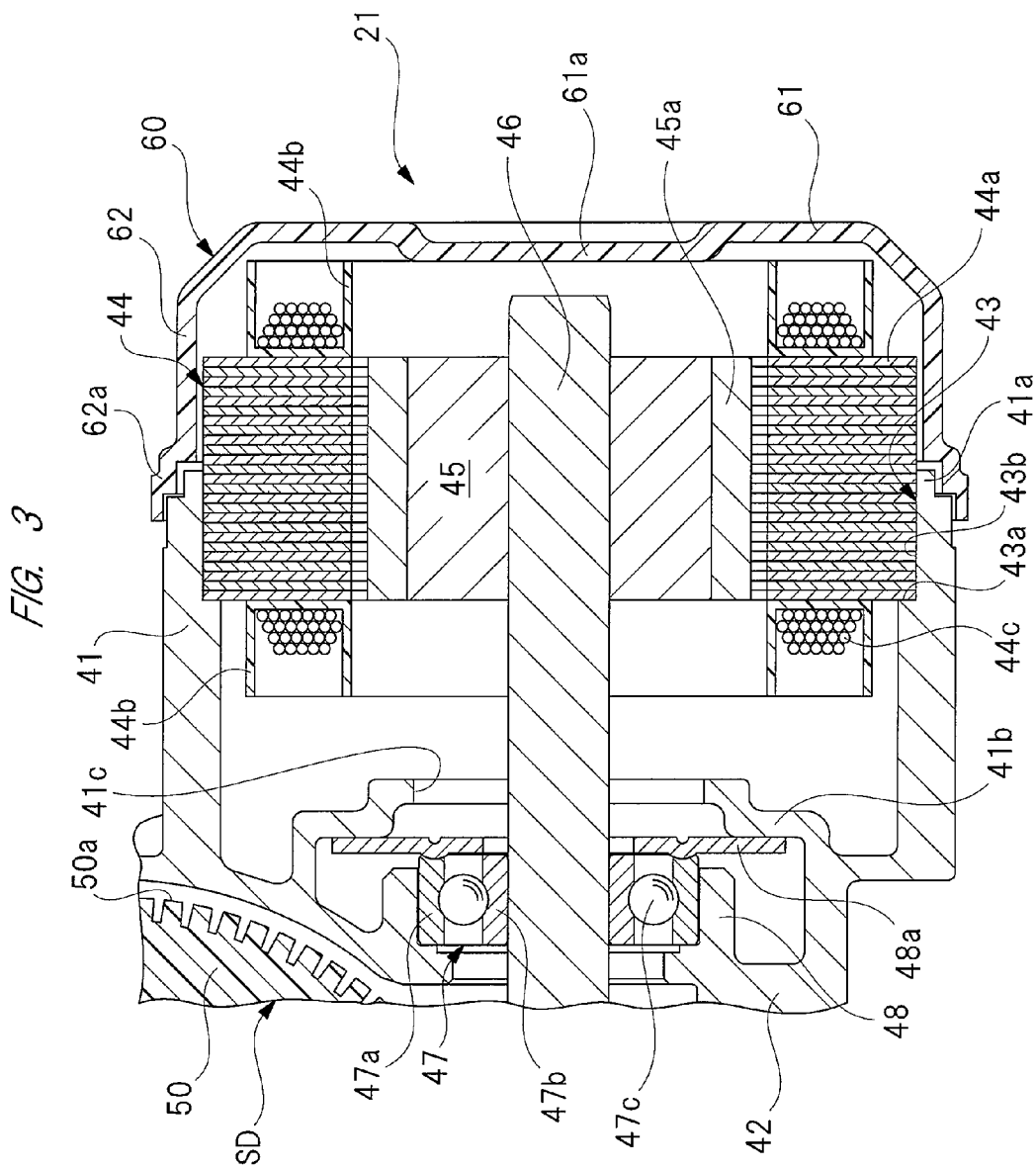
FIG. 3 is a partially enlarged sectional view for explaining the structure of a motor unit.
Figure 4:
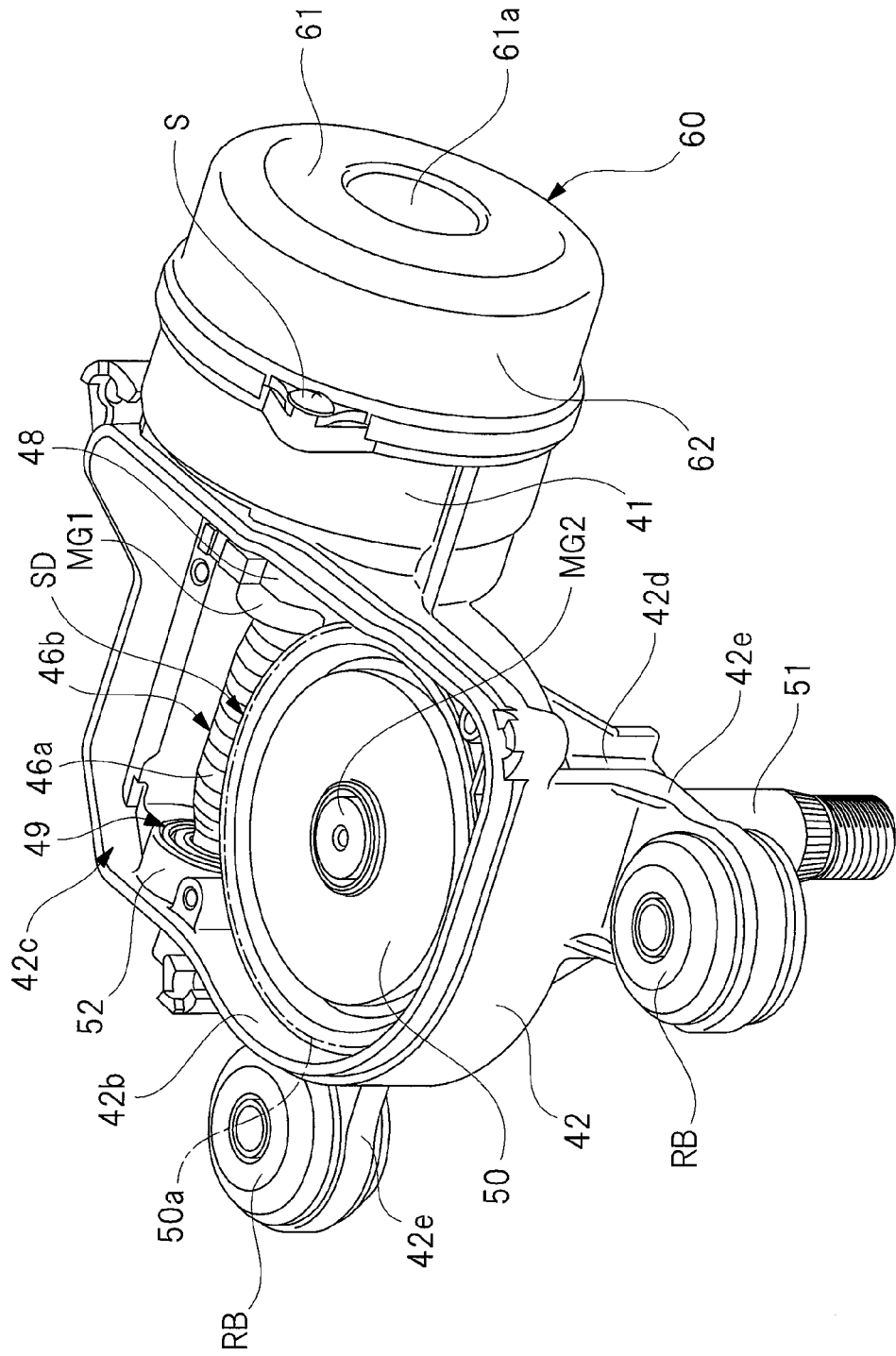
FIG. 4 is a perspective view (not showing a gear cover) showing the details of the interior of a housing.
Figure 5:
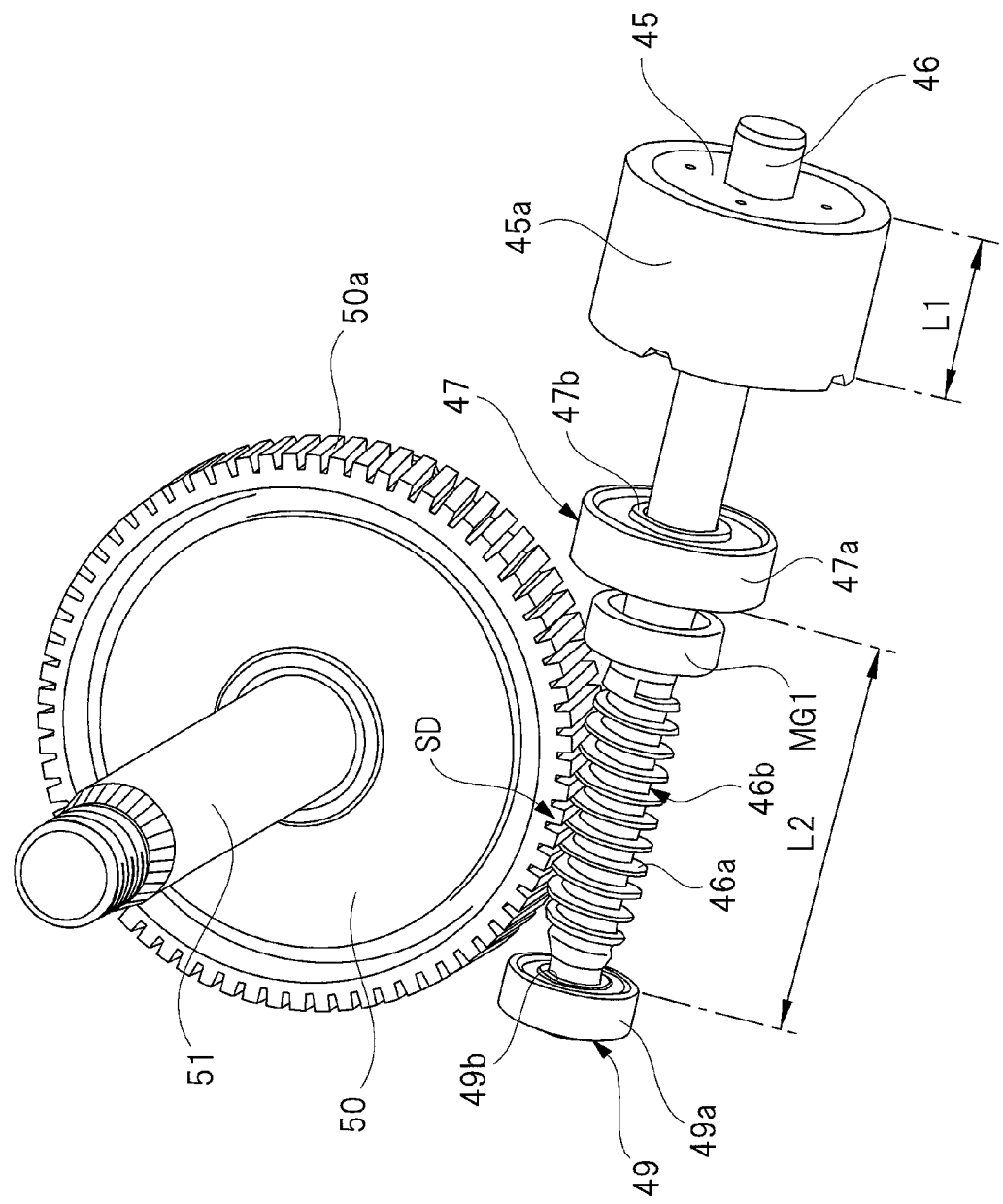
FIG. 5 is a perspective view showing a speed-reducing mechanism, a rotating shaft, and a rotor.
Figure 6:
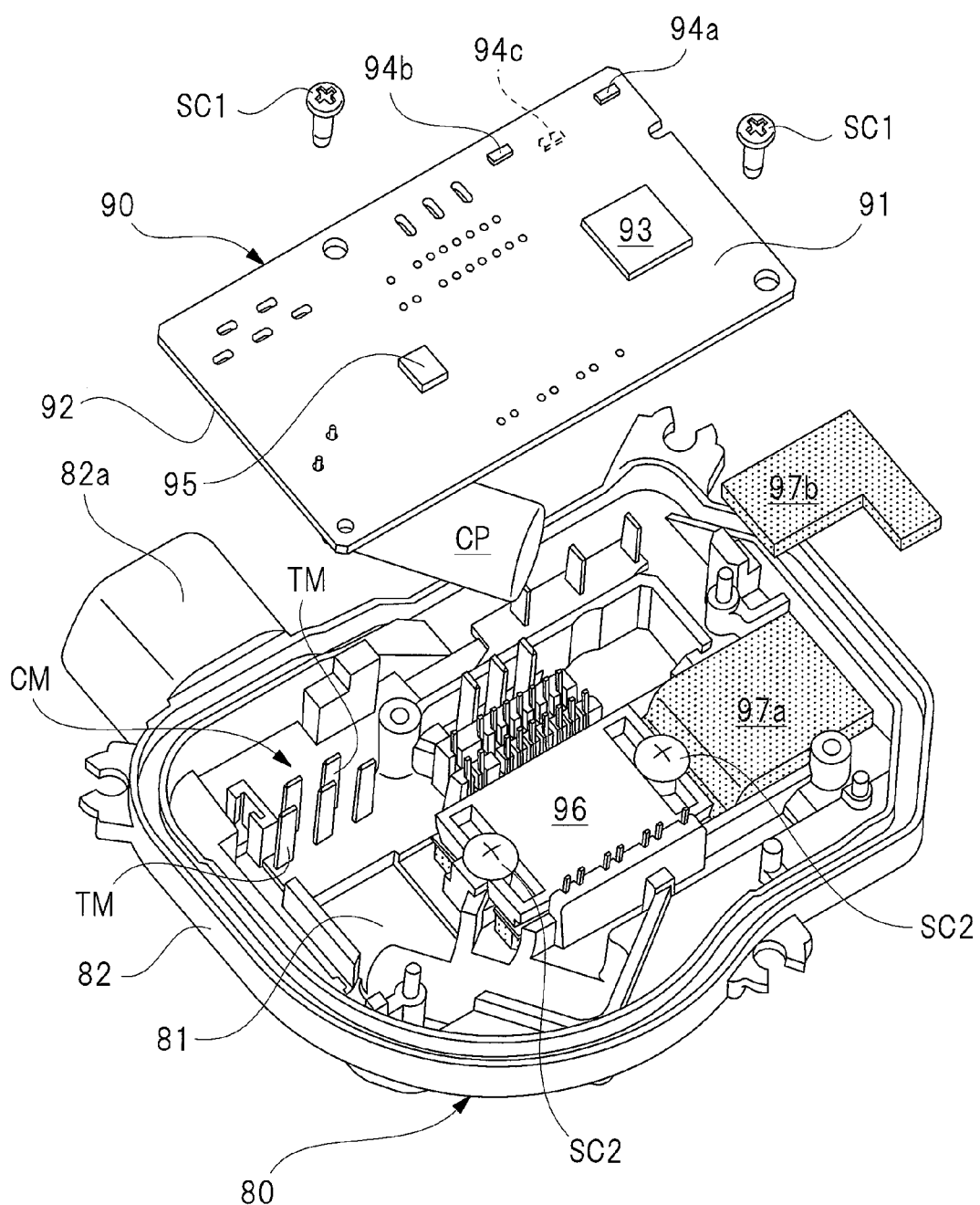
FIG. 6 is an exploded perspective view showing the interior of the gear cover.
Figure 7:
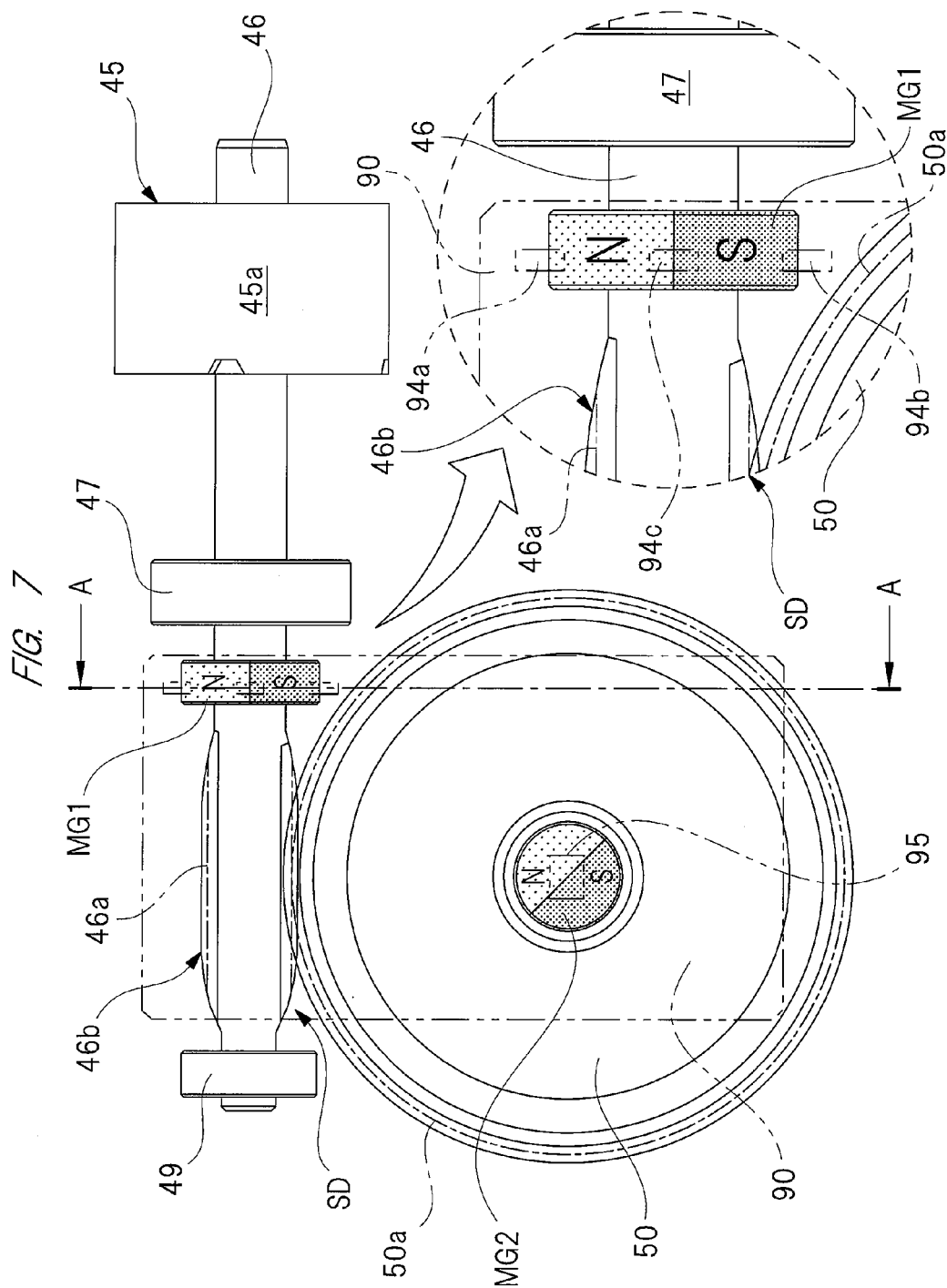
FIG. 7 is a diagram for explaining the positional relation between each Hall IC, an MR sensor, a first sensor magnet, and a second sensor magnet.
Figure 8:
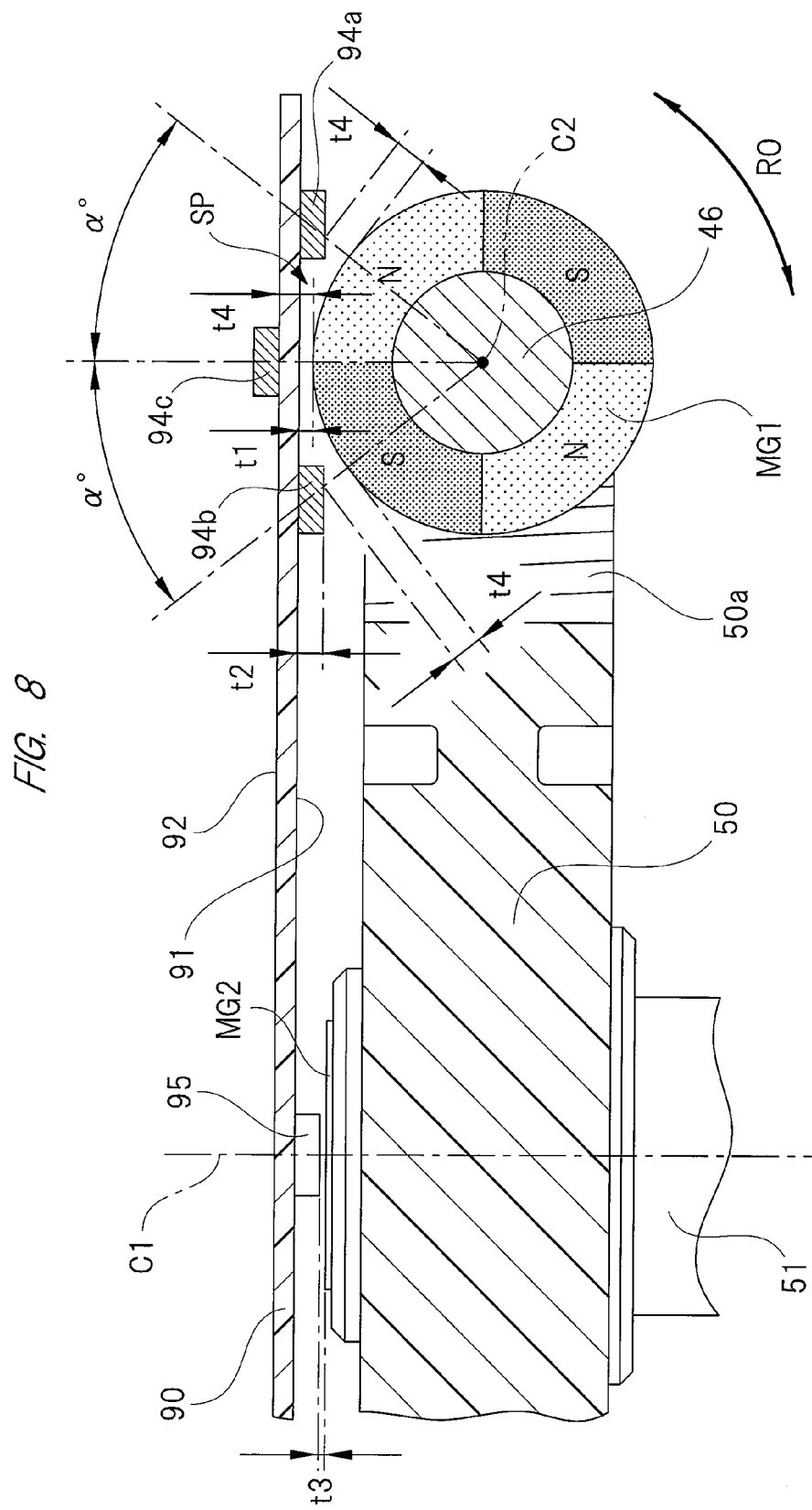
FIG. 8 is a sectional view taken along an A-A line of FIG. 7.
Figure 9:
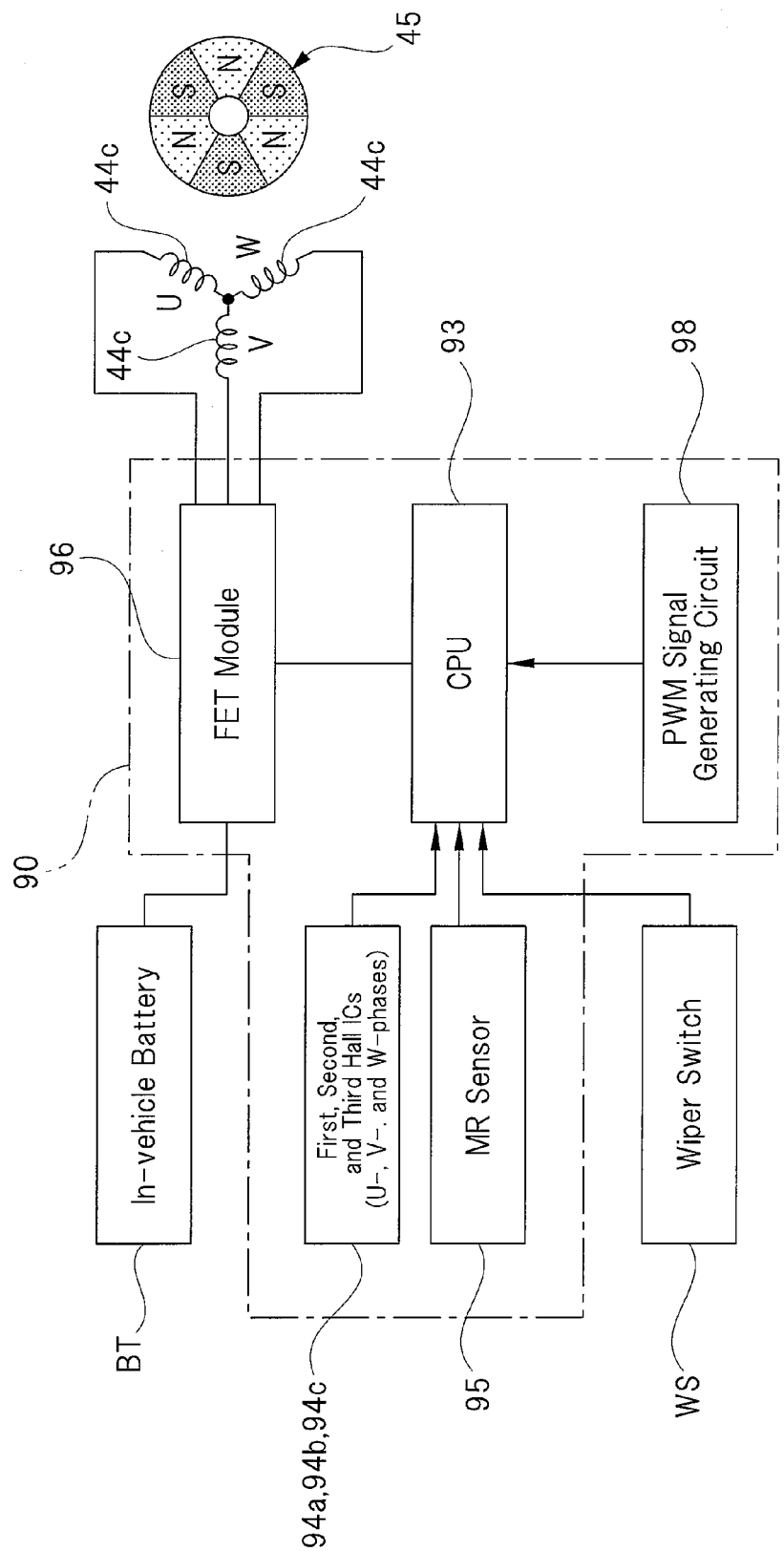
FIG. 9 is a block diagram showing an electric system of the DR-side wiper motor.
Figure 10:
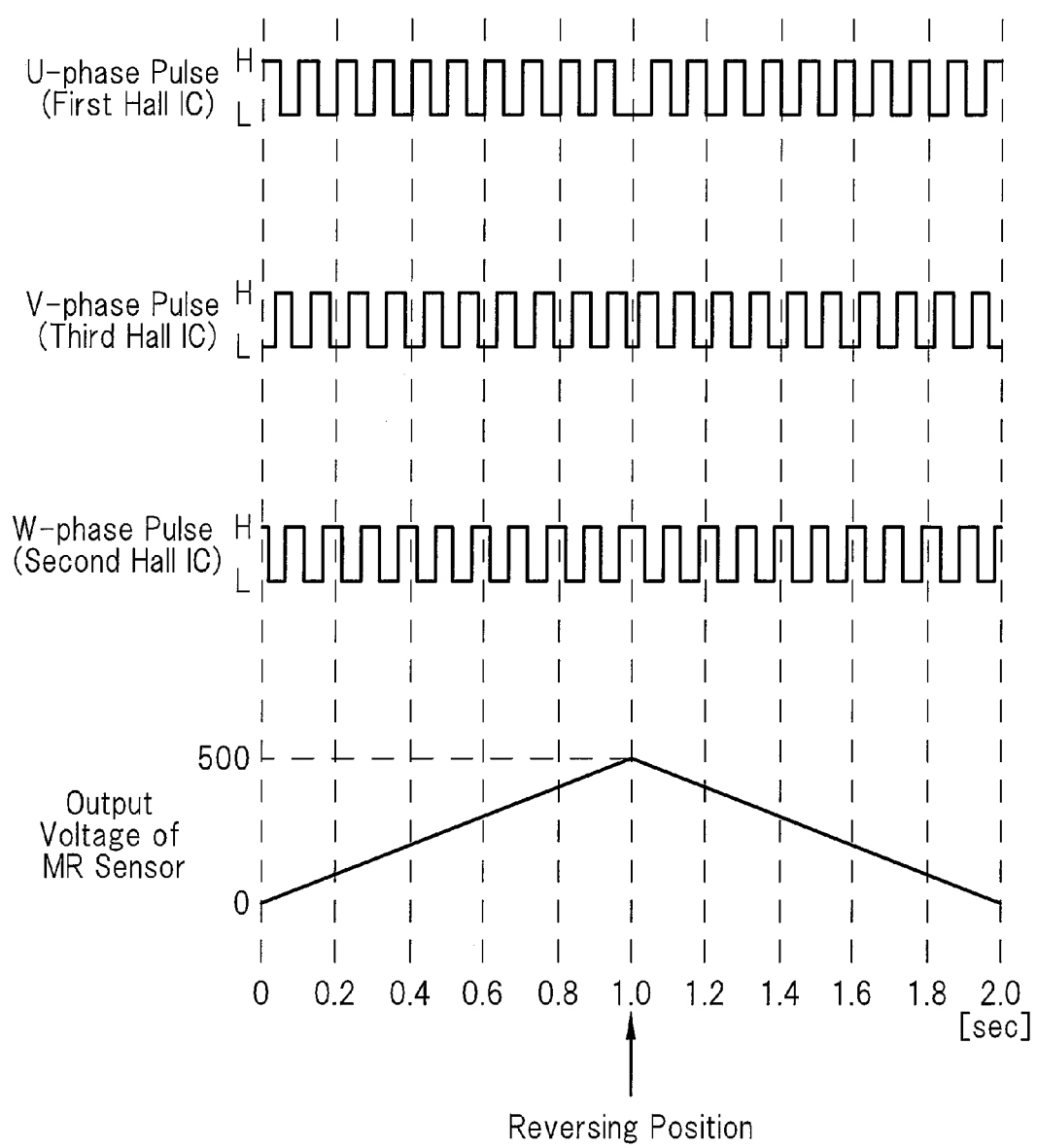
FIG. 10 is a pulse waveform chart showing pulse waveforms output from the Hall ICs and the MR sensor.

FIG. 1 shows a mounted state of a wiper apparatus of the present invention on a vehicle body, FIG. 2 is a perspective view of a DR-side wiper motor of FIG. 1 which is observed from an output shaft side, FIG. 3 is a partially enlarged sectional view for explaining the structure of a motor unit, FIG. 4 is a perspective view (not showing a gear cover) showing the details of the interior of a housing, FIG. 5 is a perspective view showing a speed-reducing mechanism, a rotating shaft, and a rotor, FIG. 6 is an exploded perspective view showing the interior of the gear cover, FIG. 7 is a diagram for explaining the positional relation between each Hall IC, an MR sensor, a first sensor magnet, and a second sensor magnet, FIG. 8 is a sectional view taken along an A-A line of FIG. 7, FIG. 9 is a block diagram showing an electric system of the DR-side wiper motor, and FIG. 10 is a pulse waveform chart showing pulse waveforms output from the Hall ICs and the MR sensor.

As shown in FIG. 1, a front windshield 11 is provided on the front side of a vehicle body 10 forming part of a vehicle such as an automotive vehicle. A DR-side wiper apparatus 20 and an AS-side wiper apparatus 30 are respectively mounted on a driver-side section and a passenger-side section, which are disposed on the front end of the front windshield 11 (lower side in FIG. 1) along the width direction of the vehicle body 10 (horizontal direction in FIG. 1). In this manner, the wiper apparatus according to this embodiment is provided as an opposed wiping type wiper apparatus having a wiper apparatus mounted on the driver-side and a wiper apparatus mounted on the passenger-side. The term "DR-side" represents driver-side, while the term "AS-side" represents passenger-side.

The DR-side wiper apparatus 20 has a DR-side wiper motor 21, while the AS-side wiper apparatus has an AS-side wiper motor 31. The wiper motor 21 and the wiper motor 31 cause a DR-side wiper arm 22 and an AS-side wiper arm 32 (not shown) to swing at a given swing angle, respectively. As a result, wiper blades (not shown) attached to the respective front ends of the wiper arms 22 and 32 are reciprocally moved so as to perform their wiping action on the front windshield 11, thereby removing rainwater, etc. from the front windshield 11 to ensure fine visibility. The wiper arms 22 and 32 and the wiper blades make up a wiper of the present invention.

A dash panel 12 making up the framework of the vehicle body 10 is provided to the front side of the vehicle body 10. The dash panel 12 is formed in such a way as to laterally extend between the DR-side and the AS-side, and it has ends in the longitudinal direction firmly fixed to a DR-side inside panel 13 and an AS-side inside panel 14 which make up the framework of the vehicle body 10 by welding, etc. Each of the dash panel 12, the DR-side inside panel 13, and the AS-side inside panel 14 is of high strength.

A DR-side first fixing portion 12a and an AS-side first fixing portion 12b are firmly fixed to the dash panel 12 by welding, etc. A DR-side second fixing portion 13a and a DR-side third fixing portion 13b are firmly fixed to the DR-side inside panel 13 by welding, etc. An AS-side second fixing portion 14a and an AS-side third fixing portion 14b are firmly fixed to the AS-side inside panel 14 by welding, etc.

In addition, the DR-side wiper apparatus 20 is fixed to the DR-side first fixing portion 12a, the DR-side second fixing portion 13a, and the DR-side third fixing portion 13b so as to be supported by these fixing portions. The AS-side wiper apparatus 30 is fixed to the AS-side first fixing portion 12b, the AS-side second fixing portion 14a, and the AS-side third fixing portion 14b so as to be supported by these fixing portions. A hatched part shown in FIG. 1 represents a fixing portion (high strength portion) of the vehicle body 10, to which the DR-side wiper apparatus 20 and the AS-side wiper apparatus 30 are fixed.

Here, the DR-side wiper motor 21 and the AS-side wiper motor 31 is formed as shown in FIG. 1, the same as each other in structure, and each provided with three fitting portions "a", "b" and "c". The fitting portions "a", "b" and "c" of the DR-side wiper motor 21 are attached to the DR-side third fixing portion 13b, the DR-side second fixing portion 13a, and the DR-side first fixing portion 12a, respectively, via fastening bolts (not shown). The fitting portions "a", "b" and "c" of the AS-side wiper motor 31 are attached to the AS-side first fixing portion 12b, the AS-side second fixing portion 14a, and the AS-side third fixing portion 14b via fastening bolts (not shown).

Since the wiper motors 21 and 31 are the same in structure as each other, the detailed structure of the DR-side wiper motor 21 will be described as the structure of each of the wiper motors 21 and 31 with reference to the drawings.

As shown in FIGS. 2 to 6, the DR-side wiper motor (simply "brushless motor") 21 includes: an aluminum housing 40; a plastic motor cover 60; and a plastic gear cover 80. The housing 40, the motor cover 60, and the gear cover 80 are connected to each other with a plurality of fastening screws "S" (two of them are shown in FIG. 2), each sealing member (not shown) such as O-ring is provided between the housing 40 and the motor cover 60 and between the housing 40 and the gear cover 80 so as to prevent entry of rainwater, etc., into the DR-side wiper motor 21.

The housing 40 is formed by casting a melted aluminum material into a given shape. The housing 40 has a motor housing 41 and a speed-reducing mechanism housing 42. The motor housing 41 has bottomed cylindrical shape as shown in FIG. 3. One end in the axial direction of the motor housing 41 (right side in FIG. 3) is formed with an opening portion which has stepped annual cover-attachment portion 41a on which a mounting portion 62a of the motor cover 60 is mounted. The other end in the axial direction of the motor housing 41 (left side in FIG. 3) is formed with an annual bottom 41b which has a center portion formed with a through-hole 41c through which a rotating shaft 46 extends rotatably.

An annular stepped portion 43 is formed on the interior of the motor housing 41. The stepped portion 43 is composed of an annular bottom wall 43a and a cylindrical side wall 43b. A stator core (stator) 44 is placed inside the stepped portion 43. The stator core 44 is formed into an almost cylindrical shape by stacking and bonding together a plurality of steel plates 44a made of magnetic material. About half of the outer periphery of stator core 44, which is closer in the axial direction to the speed-reducing mechanism housing 42, is press fitted in the side wall 43b making up the inner periphery of the motor housing 41. Hence, the stator core 44 and the motor housing 41 are firmly fixed to each other.

Coil bobbins 44b are insulators, made of resin, and disposed on respective end sides of the stator core 44 in the axial direction. Wires are respectively wound around the coil bobbins 44b so as to form U-phase, V-phase and W-phase (three phases) coils 44c of given number of turns. One ends (not shown) of the U-phase, V-phase, and W-phase coils 44c are electrically connected to each other by star wiring (Y wiring). On the other hand, the coils 44c may be connected to each other by not only star wiring but also other methods of wiring, such as delta wiring (triangular wiring).

The coils 44c are electrically connected to a control board 90 (see FIG. 6) fixed inside the gear cover 80, via a wiring unit (not shown) placed inside the housing 40. A driving current is supplied to each of the coils 44c at a given timing from an EFT module 96 (see FIG. 6) mounted on the control board 90. As a result, an electromagnetic force is generated at the stator core 44, and a rotor 45 is driven by a given driving torque (driving force) and rotated in a given rotation direction.

Radial inside of the stator core 44, the rotor 45 is rotatably disposed via a given air gap between the rotor 45 and the stator core 44. The rotor 45 is formed into a substantially cylindrical shape by stacking and bonding together a plurality of steel plates made of magnetic material (not shown). The exterior surface of the rotor 45 in its radial direction is fitted with a permanent magnet 45a formed into a substantially cylindrical shape.

The permanent magnet 45a is disposed such that its magnetic poles (S-poles, N-poles) are alternately placed along the rotation direction of the rotor 45 (not shown). In this manner, the DR-side wiper motor 21 is provided as a brushless motor of an SPM (Surface Permanent Magnet) structure in which the surface of the rotor 45 is fitted with the permanent magnet 45a. However, the DR-side wiper motor 21 may be provided as a brushless motor of a structure different from the SPM structure, such as a brushless motor of an IPM (Interior Permanent Magnet) structure in which permanent magnets are embedded inside the rotor 45.

Furthermore, the substantially-cylindrical single permanent magnet 45a may be replaced with a plurality of permanent magnets each of which has a substantially-arc shape in cross section in a direction of crossing the shaft center of the rotor 45, and which are arranged at equal intervals along the circumference of the rotor 45 such that their magnetic poles are placed alternately. The permanent magnet 45a is determined arbitrarily to have two, four, or more magnetic poles in accordance with the specifications of the DR-side wiper motor 21.

As shown in FIGS. 3, 5, and 7, one end side of the rotating shaft 46 in its axial direction (right side in FIGS. 3, 5, and 7) is fixed to the shaft center of the rotor 45. On the other end side of the rotating shaft 46 in its axial direction (left side in FIGS. 5 and 7), a worm gear 46b having spiral teeth 46a molded by a rolling process, etc., is integrally formed. The worm gear 46b formed on the rotating shaft 46 is disposed closer to the speed-reducing mechanism housing 42 than the through-hole 41c, and combines with a worm wheel 50 engaged with the worm gear 46b to make up a speed-reducing mechanism SD.

Here, the rotor 45, the permanent magnet 45a, and the rotating shaft 46 collectively make up a rotating element of the present invention. In addition, the rotor 45, the permanent magnet 45a, the rotating shaft 46, the stator core 44, the coil bobbins 44b, and the coils 44c collectively make up a motor unit of the present invention.

A first ball bearing 47 is disposed between the rotor 45 and the worm gear 46b which are set along the axial direction of the rotating shaft 46. The first ball bearing 47 is made up of an outer ring 47a, an inner ring 47b, and a plurality of steel balls 47c arranged between the outer ring 47a and the inner ring 47b, which are made of steel. The inner ring 47b is fixed to the rotating shaft 46 by such fixing means as a stopper ring and caulking (not shown). The outer ring 47a is mounted on a first bearing-attachment portion 48 disposed between the motor housing 41 and the speed-reducing mechanism housing 42 of the housing 40.

Here, the first ball bearing 47 is fixed to the first bearing-attachment portion 48 by an elastic stopper 48a which keeps pressing the first ball bearing 47 to the first bearing-attachment portion 48. Fixing the first ball bearing 47 to the first bearing-attachment portion 48 in this manner makes it impossible for the rotating shaft 46 to move in its axial direction. Inside the housing 40, therefore, the rotating shaft 46 is capable of rotating smoothly without being shaken in its axial direction.

As shown in FIG. 5, a second ball bearing 49 is mounted on the other end of the rotating shaft 46 in its axial direction (left side in FIGS. 5 and 7). Similar to the first ball bearing 47, the second ball bearing 49 is made up of an outer ring 49a and an inner ring 49b, which are made of steel, and a plurality of steel balls (not shown) arranged between the outer ring 49a and the inner ring 49b. The second ball bearing 49 is smaller in size than the first ball bearing 47.

Here, the first ball bearing 47 functions to rotatably support the rotating shaft 46; and functions to prevent the rotating shaft 46 from being moved axially, the first ball bearing 47 is constructed as a large-sized, strongly-built bearing. The second ball bearing 49, on the other hand, has only the function of suppressing the shakiness of the other end of the rotating shaft 46 in its axial direction. The second ball bearing 49 is thus constructed as a small-sized bearing, which suffices for exerting such a function.

In this embodiment, by adopting the brushless motor as the DR-side wiper motor 21 and increasing the speed-reducing rate of the speed-reducing mechanism SD, it is possible to downsize the DR-side wiper motor 21. In the downsized DR-side wiper motor 21, therefore, the pitch of the teeth 46a of the worm gear 46b is small and the worm gear 46b is rotated at high speed. In this embodiment, therefore, the second ball bearing 49 is provided to suppress the shakiness of the worm gear 46b of the rotating shaft 46, thereby improving rotation efficiency. The second ball bearing 49 may be dispensed with, depending on the required speed-reducing rate of the speed-reducing mechanism SD (specifications of the wiper motor).

As shown in FIG. 5, an annular first sensor magnet (first magnet) MG1 is fixed between the worm gear 46b and the first ball bearing 47 along the axial direction of the rotating shaft 46. In other words, the worm gear 46b and the first sensor magnet MG1 are provided between the first ball bearing 47 and the second ball bearing 49.

Here, the axial dimension L1 of the rotor 45 (permanent magnet 45a) is determined to be shorter than the distance L2 along the axial direction of the rotating shaft 46 between the first ball bearing 47 and the second ball bearing 49 (L1<L2). As a result, the DR-side wiper motor 21 is reduced in size along the axial direction of the rotating shaft 46. In addition, being constructed as the brushless motor, the DR-side wiper motor 21 has no commutator and brush. This construction contributes to a reduction in size of the DR-side wiper motor 21 along the axial direction of the rotating shaft 46.

As shown in FIGS. 7 and 8, the first sensor magnet MG1 has a plurality of magnetic poles (S-poles and N-poles) arranged along the direction of rotation of the rotating shaft 46. According to this embodiment, as shown in FIG. 8, the first sensor magnet MG1 has four magnetic poles arranged at 90-degree intervals. The first sensor magnet MG1 is fixed to the radial exterior of the rotating shaft 46, and rotated together with the rotating shaft 46. Therefore, magnetic poles (S-poles and N-poles) of the first sensor magnet MG1, therefore, appear alternately when the rotating shaft 46 is rotated.

As shown in FIGS. 7 and 8, the control board 90 has a portion which faces the first sensor magnet MG1 and on which a first Hall IC (first sensor) 94a, a second Hall IC (second sensor) 94b, and a third Hall IC (third sensor) 94c are mounted. Each of the Hall ICs 94a, 94b, and 94c detects the rotation state of the rotating shaft 46 (number of rotations, rotation direction, etc.) The positional relations of the Hall ICs 94a, 94b, and 94c with the first sensor magnet MG1 will be described hereinafter.

As shown in FIGS. 2 and 4, the speed-reducing mechanism housing 42 is formed into a substantially-bathtub shape and formed with a bottom. The speed-reducing mechanism housing 42 has a bottom 42a and a side wall 42b encircling the bottom 42a, and an opening 42c which is on the opposite side of the side wall 42b from the bottom 42a (upper side in FIG. 4). The bottom 42a and the opening 42c are opposite to each other in the axial direction of the worm wheel 50. The opening 42c is closed with the gear cover 80 (see FIG. 6).

On the bottom 42a of the speed-reducing mechanism housing 42, a boss 42d is formed integrally to project outward (upper side in FIG. 2) from the speed-reducing mechanism housing 42. The side wall 42b of the speed-reducing mechanism housing 42 is provided with three fitting legs 42e integrally formed with the side wall 42b in such a way as to project toward the boss 42d. Each fitting leg 42e is fitted with a rubber bush RB. Because of these rubber bushes RB, when the DR-side wiper motor 21 is mounted on the vehicle body 10 (see FIG. 1), the vibration of the DR-side wiper motor 21 is hardly transmitted to the vehicle body 10, and conversely, the vibration of the vehicle body 10 is hardly transmitted to the DR-side wiper motor 21.

As shown in FIGS. 3 and 4, the worm wheel 50 is rotatably housed in the speed-reducing mechanism housing 42. The worm wheel 50 is made from for example POM (Polyacetal) plastic, etc. into a substantially-disc shape, and gear teeth 50a are formed on the outer periphery of the worm wheel 50. The gear teeth 50a of the worm wheel 50 are engaged with the teeth 46a of the worm gear 46b.

One end side of an output shaft 51 in its axial direction is fixed to the rotation center of the worm wheel 50. The output shaft 51 is rotatably supported by the boss 42d of the speed-reducing mechanism housing 42. The other end side of the output shaft 51 in its axial direction extends toward the outside of the speed-reducing mechanism housing 42, and the base end of the DR-side wiper arm 22 (see FIG. 1) is fixed to the other end side of the output shaft 51. In this configuration, the output shaft 51 is rotated by the rotor 45 (see FIG. 3). Specifically, the rotating speed of the rotating shaft 46 is reduced by the speed-reducing mechanism SD, and a high torque created by the reduction of the rotating speed is transmitted from the output shaft 51 to the DR-side wiper arm 22 outside the speed-reducing mechanism housing 42. In this manner, the speed-reducing mechanism SD reduces the rotating speed of the rotator 45 and transmits the high torque created by the reduction of the rotating speed to the DR-side wiper arm.

As shown in FIG. 4, a disc-shaped second sensor magnet (second magnet) MG2 is disposed on an opposite side of the worm wheel 50 from the output shaft 51, and fixed to the rotation center of the worm wheel 50. The second sensor magnet MG2 has a plurality of magnetic poles (S-poles and N-poles) arranged along the rotation direction of the output shaft 51. According to this embodiment, as shown in FIG. 7, the second sensor magnet MG2 has two magnetic poles arranged at a 180-degree interval. The second sensor magnet MG2 is mounted on one end side of the output shaft 51 in its axial direction, and rotated together with the output shaft 51 and the worm wheel 50. The magnetic poles (S-poles and N-poles) of the second sensor magnet MG2, therefore, appear alternately when the output shaft 51 is rotated.

As shown in FIGS. 7 and 8, the control board 90 has a portion facing the second sensor magnet MG2 carrying an MR sensor (fourth sensor) 95 which is disposed on the axis C1 of the output shaft 51. In this configuration, therefore, the MR sensor 95 detects the rotation state (rotation direction, rotation position, etc.) of the output shaft 51 and the worm wheel 50. The position of the MR sensor 95 with respect to the second sensor magnet MG2 will be described hereinafter.

As shown in FIG. 4, a second bearing-attachment portion 52 is formed on the side wall 42b of the speed-reducing mechanism housing 42. The second bearing-attachment portion 52 is axially aligned with the first bearing-attachment portion 48, and the second ball bearing 49 is housed in the second bearing-attachment portion 52. Here, with the second ball bearing 49 attached to the other end side of the rotating shaft 46 in its axial direction, the second ball bearing 49 is put through the through-hole 41c and through the first bearing-attachment portion 48, and fitted in the second bearing-attachment portion 52 by putting.

In addition, the second ball bearing 49 is not pressed into the second bearing-attachment portion 52, but loosely fitted into the second bearing-attachment portion 52 with a slight clearance between the second ball bearing 49 and the second bearing-attachment portion 52. For this reason, even if the first bearing-attachment portion 48 and the second bearing-attachment portion 52 are axially shifted from each other during manufacturing of the housing 40, the rotation resistance of the rotating shaft 46 is not increased.

As shown in FIGS. 2 to 4, the motor cover 60 is formed as a bottomed cylindrical shape, and has a substantially-disc shaped bottom 61 and a cylindrical wall 62 encircling the bottom 61. At the center of the bottom 61, a concave portion 61a is concave on the same side as the cylindrical wall 62 so as to enhance the strength of the bottom 61. That is, the concave portion 61a makes the bottom 61 rigid enough to be hardly bendable. This structure prevents the motor cover 60 from resonating with vibrations of the DR-side wiper motor 21 during operation, thereby improving the stillness of the DR-side wiper motor 21.

As shown in FIG. 3, in the cylindrical wall 62, the mounting portion 62a is closer to the motor housing 41, and mounted on the cover-attachment portion 41a of the motor housing 41. The mounting portion 62a is formed into an annular shape, and stepped in the same manner as the cover-attachment portion 41a which is fitted into the mounting portion 62a.

As shown in FIG. 6, the gear cover 80 is used to close the opening 42c of the speed-reducing mechanism housing 42 (see FIG. 4), and it has the same outline as the opening 42c. The gear cover 80 has a bottom wall 81 and a side wall 82. The control board (simply "board") 90 is fixed to the bottom wall 81 inside the gear cover 80, with first fixing screws SC1.

The side wall 82 of the gear cover 80 is integrally formed with a connector connection 82a which is connected to an external connector (not shown) provided to the vehicle body 10. Inside the connector connection 82a, terminals provided to one ends (not shown) of conductive members CM are exposed to the outside, and terminals TM provided to the other ends of the conductive members CM are electrically connected to the control board 90. An in-vehicle battery BT and a wiper switch WS (see FIG. 9) are electrically connected to the external connector provided to the vehicle body 10.

As shown in FIG. 6, the control board 90 has: a first surface 91 on the opposite side from the bottom wall 81 of the gear cover 80, that is, on the same side as the rotating shaft 46 and the output shaft 51 (upper side in FIG. 6); and a second surface 92 on the same side as the bottom wall 81 of the gear cover 80, that is, on the opposite side from the first surface 91 (lower side in FIG. 6).

A CPU 93 for comprehensively controlling the DR-side wiper motor 21, the first and second Hall ICs 94a and 94b facing the first sensor magnet MG1 (see FIGS. 7 and 8), and the MR sensor 95 facing the second sensor magnet MG2 (see FIGS. 7 and 8) are mounted on the first surface 91 of the control board 90. Here, as shown in FIG. 8, the first and second Hall ICs 94a and 94b are arranged at a given interval along the rotation direction RO of the rotating shaft 46 (first sensor magnet MG1).

On the other hand, the FET module 96 as a driving electronic component, the third Hall IC 94c facing the first sensor magnet MG1 (see FIGS. 7 and 8), and a capacitor CP which is another electronic component are mounted on the second surface 92 of the control board 90. Here, the third Hall IC 94c mounted on the second surface 92 is disposed between the first Hall IC 94a and the second Hall IC 94b which are mounted on the first surface 91.

Furthermore, the FET module 96 is composed of a plurality of switching elements which switch states of current to be supplied to the coils 44c of three phases (see FIG. 3) at high speed. The FET module 96, therefore, tends to generate heat. In order to improve the heat dissipation performance of the FET module 96, the FET module 96 is connected to the housing 40 via a heat conductive member 97a and a heat conductive sheet 97b (which are hatched in FIG. 6).

In addition, as shown in FIG. 6, before the control board 90 is mounted to the bottom wall 81 of the gear cover 80, the FET module 96 is fixed to the bottom wall 81 of the gear cover 80 in advance with a pair of second fixing screws SC2. The FET module 96 is then bonded to the second surface 92 of the control board 90 by connecting means such as soldering.

Here, the CPU 93 makes up a control unit of the present invention, and the FET module 96 makes up a driving unit of the present invention. This means that the CPU 93 and the FET module 96 supply a driving current to the DR-side wiper motor 21 to control the rotation of the rotor 45 (see FIG. 3). The CPU 93 controls the FET module 96 on the basis of detection values (see FIG. 10) given by the Hall ICs 94a, 94b, and 94c and the MR sensor 95. Hence, the rotation of the rotor 45 is controlled.

As shown in FIG. 8, since the third Hall IC 94c is not mounted on the first surface 91 of the control board 90, a space SP is formed between the first and second Hall ICs 94a and 94b mounted on the first surface 91 of the control board 90. The first sensor magnet MG1 is partially stuck into the space SP. As a result, the control board 90 is set closer to the first and second sensor magnets MG1 and MG2. Hence, the DR-side wiper motor 21 is reduced in thickness (or in size), and at the same time, the detection precision of the Hall ICs 94a, 94b, and 94c and MR sensor 95 is improved.

More specifically, the distance t1 (about 2.0 mm) from the first sensor magnet MG1 to the first surface 91 of the control board 90 is shorter than each height t2 (about 4.0 mm) of the Hall ICs 94a, 94b, and 94c from the first and second surfaces 91 and 92 (t1<t2). The distance t3 (about 1.0 mm) from the second sensor magnet MG2 to the MR sensor 95 is shorter than the distance t1 from the first sensor magnet MG1 to the first surface 91 of the control board 90 (t3<t1).

Furthermore, the Hall ICs 94a, 94b, and 94c are arranged at respective positions corresponding to equal central angles α (about 30 degrees each) around the axis C2 of the first sensor magnet MG1. As a result, the distance between each of the Hall ICs 94a, 94b, and 94c and the first sensor magnet MG1 is roughly determined to be the same distance of t4. This allows each of the Hall ICs 94a, 94b, and 94c to precisely detect a magnetic pole shift caused by the rotation of the first sensor magnet MG1 without making a detection failure. Since the distance t3 from the second sensor magnet MG2 to the MR sensor 95 is shorter than the distance t4, the MR sensor 95 is also capable of detecting the change in magnetic poles of the second sensor magnet MG2 with high precision and certainty.

Here, the first sensor magnet MG1 is not limited to four poles. The first sensor magnet MG1 may have two or six magnetic poles. When the first sensor magnet MG1 has two magnetic poles, the central angle a is determined to be about 60 degrees. When the first sensor magnet MG1 has six magnetic poles, the above central angle a is determined to be about 20 degrees.

The control board 90 has an electronic circuit as shown in FIG. 9. More specifically, the control board 90 has a PWM signal generating circuit 98, in addition to the FET module 96 and CPU 93. The FET module 96 is electrically connected to the in-vehicle battery BT and the coils 44c of U-phase, V-phase, and W-phase. Switching elements provided in the FET module 96 has: three positive-side switching elements (not shown) connected to the positive electrode of the in-vehicle battery BT and corresponding to the U-, V- and W-phases; and three negative-side switching elements (not shown) connected to the negative electrode of the in-vehicle battery BT and corresponding to the U-, V- and W-phases.

The CPU 93 is electrically connected to the FET module 96 and controls switching on and off of the switching elements in the FET module 96. The CPU 93 is composed of a known microcomputer having a RAM, ROM, etc. (not shown).

The PWM signal generating circuit 98 determines a duty ratio for intermittently switching on and off the switching elements of the FET module 96, and sends a duty ratio signal to the CPU 93. As a result, a separately switching ratio of each switching element of the FET module 96 (on-time) is adjusted to control a driving current to be supplied to each coil 44c.

As described above, the control board 90 has: three Hall ICs, i.e., the first Hall IC 94a, the third Hall IC 94c, and the second Hall IC 94 corresponding to the U-phase, the V-phase and the W-phase, respectively; and one MR sensor 95. Each of the Hall ICs 94a, 94b, and 94c makes a switching action on the basis of the change in magnetic poles of the first sensor magnet MG1, and generates a pulse signal (square wave signal)(see, FIG. 10). In other words, each of the Hall ICs 94a, 94, and 94c serves as a non-contact rotary sensor used in combination with a magnet.

On the other hand, the MR sensor 95 is composed of a magnetic resistance element, and outputs an output voltage in the form of an electric signal. The resistance value of the MR sensor 95 changes in response to the change in direction of magnetic flux caused by the rotation of the second sensor magnet MG2 facing the MR sensor 95. As a result, as shown in FIG. 10, an output voltage (0 to 500 mV) of the MR sensor 95 changes substantially linearly, and more specifically, the MR sensor 95 is so adjusted that its output voltage becomes the maximum at the point in time of 1.0 sec., which is the reversing position of the DR-side wiper arm 22 (see, FIG. 1). This allows detection of the rotation position (absolute position) of the output shaft 51 relative to the housing 40.

Furthermore, the wiper switch WS provided in the vehicle interior, etc. (not shown) is electrically connected to the CPU 93. An operation signal for operating the wiper switch WS is, therefore, input to the CPU 93. Here, the operation signal for operating the wiper switch WS varies depending on a state of operation of the wiper switch WS by an operator, such as for example, a high-speed wiping operation signal (High), a low-speed wiping operation signal (Low), an intermittent wiping operation signal (Int), etc.

An operation of the DR-side wiper motor 21 configured in the above manner will then be descried with reference to the drawings.

In FIG. 10, "U-Phase pulse" represents an output waveform from the first Hall IC 94a, "V-Phase pulse" represents an output waveform from the third Hall IC 94c, and "W-Phase pulse" represents an output waveform from the second Hall IC 94b. In FIG. 10, "H" denotes a state in which the Hall IC switches on, and "L" denotes a state in which the Hall IC switches off. The MR sensor 95 outputs the maximum output voltage "500 mV" at the point in time of "1.0 sec.", which is the reversing position of the DR-side wiper arm 22.

When the operator operates the wiper switch WS to rotate the DR-side wiper motor 21 (0 sec.), driving currents are supplied in sequence from the in-vehicle battery BT to the three coils 44c via the FET module 96. As a result, the rotor 45 rotates at a given number of rotations, which causes the DR-side wiper arm 22 to start its wiping action from a lower reversing position (stop position) toward an upper reversing position. Here, the number of rotations of the rotor 45, i.e., the moving speed of the DR-side wiper arm 22 is determined by an operation signal (High or Low) from the wiper switch SW.

When the DR-side wiper motor 21 is caused to rotate the rotor 45, the Hall ICs 94a, 94b, and 94c output pulse signals with given phase differences in sequence at relatively short intervals (0 sec.). Timing of appearance and the number of times of generations of pulse signals of U-phase, V-phase, and W-phase are input to and saved by the CPU 93. As shown in FIG. 8, the distance between each of the Hall ICs 94a, 94b, and 94c and the first sensor magnet MG1 is almost equal to the distance t4. The Hall ICs 94a, 94b, and 94c, therefore, do not fail in detecting the change in magnetic poles of the first sensor magnet MG1 caused by its rotation, thereby showing better detection precision.

While detecting the rotation position of the rotor 45 relative to the stator core 44 on the basis of pulse signals (three phases) from the Hall ICs 94a, 94b, and 94c, the CPU 93 controls switching on and off of each switching element of the FET module 96 to rotate the DR-side wiper motor 21. The CPU 93 detects the number of rotations of the rotating shaft 46 on the basis of two of the three pulse signals, thereby rotating the DR-side wiper motor 21 at the number of rotations corresponding to the operation signal from the wiper switch WS.

When the DR-side wiper motor 21 is caused to rotate the worm wheel 50 and the output shaft 51, the MR sensor 95 outputs an output voltage changing substantially linearly (0 sec.) in response to the rotation of the worm wheel 50 (output shaft 51). The output voltage of the MR sensor 95 is input to and saved by the CPU 93. The distance t3 between the second sensor magnet MG2 and the second sensor 95 is about 1.0 mm, which is extremely short. This allows the MR sensor 95 to captures the rotation state of the second sensor magnet MG2 (rotation state of the output shaft 51) certainly with high precision.

On the basis of the output voltage of the MR sensor 95, the CPU 93 detects the rotation position of the output shaft 51 relative to the housing 40, thereby detecting the position of DR-side wiper arm 22 relative to the front windshield 11. The CPU 93 controls switching on and off of each switching element of the FET module 96 to rotate the DR-side wiper motor 21, thereby stopping or moving DR-side wiper arm 22 in a reversing direction at a given position on the front windshield 11.

As shown in FIG. 10, the DR-side wiper arm 22 is reciprocally moved on the front windshield 11 in a period between 0 sec. to 2.0 sec. This means that the DR-side wiper arm 22 moves toward an upper reversing position in a period between 0 sec. and 1.0 sec. and then at the point in time of 1.0 sec., is moved in the reversing direction, that is, switches from the clockwise motion to the counterclockwise motion. From the point in time of 1.0 sec., therefore, the DR-side wiper arm 22 moves toward a lower reversing position in a period between 1.0 sec. and 2.0 sec. Hence, as indicated by a reversing position arrow in FIG. 10, the pulse signals of three phases and output voltage are bisymmetrical with respect to the point in time of 1.0 sec. in FIG. 10.

As described above in detail, according to this embodiment, the rotating shaft 46 and the output shaft 51 are provided on the first surface 91 of the control board 90, and the first and second Hall ICs 94a and 94b facing the first sensor magnet MG1 are arranged at a given interval along the rotation direction RO of the rotating shaft 46 on the first surface 91 of the control board 90. The second surface 92 of control board 90 is opposite to the first surface 91, the third Hall IC 94c facing the first sensor magnet MG1 is disposed between the first Hall IC 94a and the second Hall IC 94b on the second surface 92 of control board 90. The MR sensor 95 facing the second sensor magnet MG2 is also mounted on the first surface 91.

In this configuration, the distance between the first Hall IC 94a and the first sensor magnet MG1, the distance between the second Hall IC 94b and the first sensor magnet MG1, and the distance between the third Hall IC 94c and the first sensor magnet MG1 are each determined to be almost equal to the distance of T4. As a result, the motor unit can be controlled with higher precision.

Furthermore, since the first, second, and third Hall ICs 94a, 94b, and 94c and the MR sensor 95 are mounted on the same single control board 90, there is no need to prepare a sensor board provided with only the first, second, and third Hall ICs 94a, 94b, and 94c, thereby suppressing an increase of components.

Furthermore, since the third Hall IC 94c is mounted on the second surface 92, the space SP can be formed between the first Hall IC 94a and the second Hall IC 94b, on the first surface 91. Using the space SP, therefore, the first sensor magnet MG1 can be placed closer to the first surface 91 of the control board 90. This allows a further reduction in size and weight of the DR-side wiper motor 21.

Furthermore, according to this embodiment, the CPU 93 and the FET module 96 control the rotation of the rotating shaft 46 on the basis of detection values given by the first, second and third Hall ICs 94a, 94b, and 94c and the MR sensor 95. The DR-side wiper motor 21 is, therefore, driven with high precision.

Furthermore, according to this embodiment, the rotating shaft 46 has the first ball bearing 47 and the second ball bearing 49, and the worm gear 46b making up the speed-reducing mechanism SD, and the first sensor magnet MG1 are arranged between the ball bearing 47 and the ball bearing 49 which are arranged along the axial direction of the rotating shaft 46. In this configuration, the first sensor magnet MG1 can be disposed to be distant from the permanent magnet 45a, which prevents a drop in the detection precision of the first, second and third Hall ICs 94a, 94b, and 94c.

Furthermore, according to this embodiment, the axial dimension L1 of the rotor 45 is determined to be shorter than the distance L2 between the ball bearing 47 and the ball bearing 49 (L1<L2). As a result, the size of the DR-side wiper motor 21 along the axial direction of the rotating shaft 46 is reduced to reduce the size and weight of the DR-side wiper motor 21.

Furthermore, according to this embodiment, the FET module 96 which supplies a driving current to the coils 44c wound around the stator core 44 is mounted on the second surface 92. As a result, there is no need to mount the FET module 96, which is a relatively large-sized electronic component, on the first surface 91, thereby allowing the first sensor magnet MG1 and the second sensor magnet MG2 to be placed closer to the first surface 91 of the control board 90. The DR-side wiper motor 21, therefore, can be further reduced in size and weight.

Furthermore, according to this embodiment, three Hall ICs (Hall elements) are adopted as rotation sensors which detect the rotation state of the rotating shaft 46. These Hall ICs which are relatively small electronic components thus accurately detect the rotation state of the rotating shaft 46. As a result, an increase in thickness dimension of the control board 90 carrying a plurality of electronic components is suppressed to reduce the size and weight of the DR-side wiper motor 21.

Then, a second embodiment of the present invention will be described in detail with reference to the drawings. The components functionally the same as those of the first embodiment will be denoted by the same reference numerals, and the detailed description thereof are omitted here.

Figure 11:
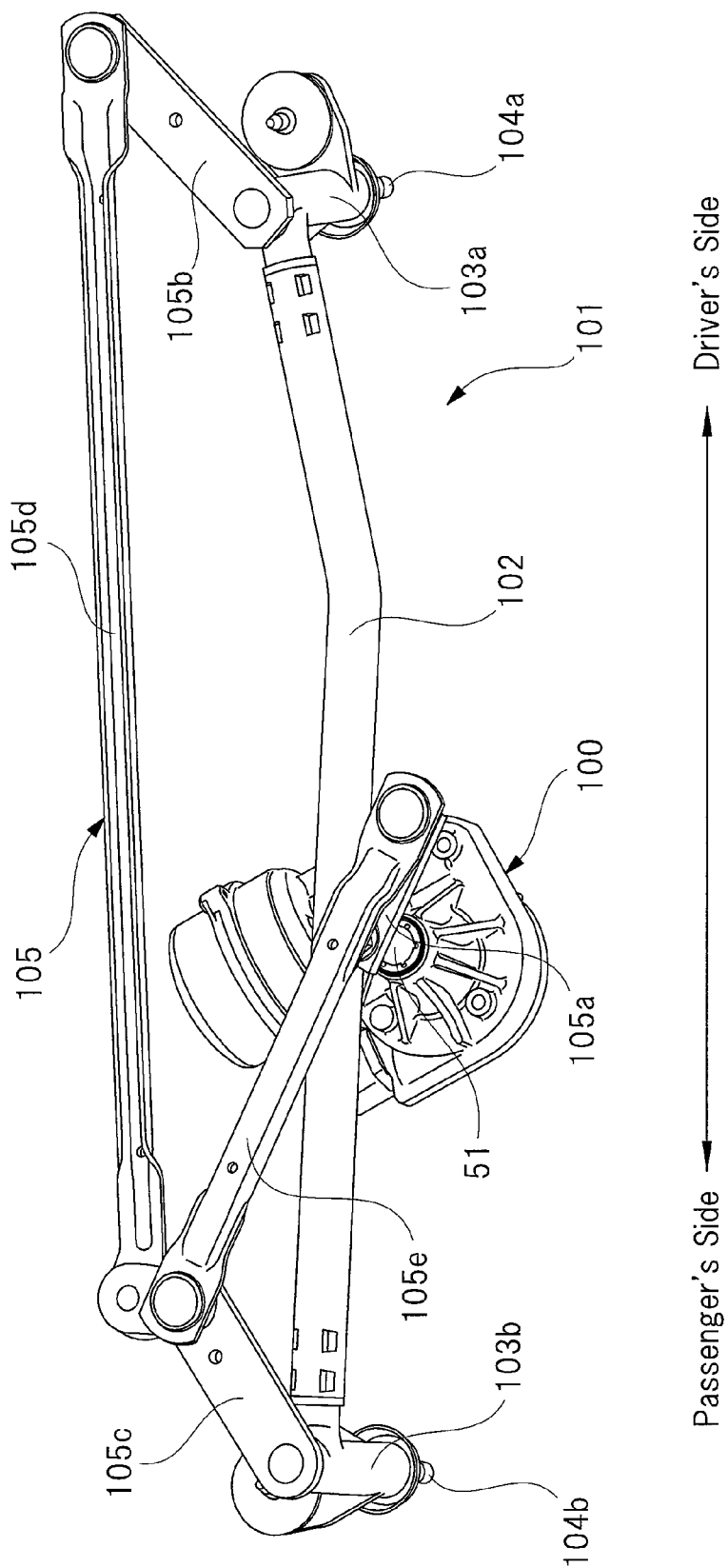
FIG. 11 is a perspective view of a wiper apparatus according to a second embodiment.

FIG. 11 is a perspective view of a wiper apparatus according to the second embodiment.

In a wiper apparatus explained as so-called "opposed wiping type wiper apparatus" in the first embodiment, as shown in FIG. 1, the DR-side wiper apparatus 20 and the AS-side wiper apparatus 30 are respectively arranged in the driver-side section and the passenger-side section in the width direction of the vehicle body 10, and the DR-side wiper arm 22 and the AS-side wiper arm 32 are caused to swing at a given swing angle, respectively. The second embodiment, as shown in FIG. 11, provides a configuration in which a wiper motor 100 serving as a brushless motor is applied to a modular-type wiper apparatus 101.

The modular-type wiper apparatus 101 has a pipe frame 102. At the approximate center of the pipe frame 102 in its longitudinal direction, a portion substantially serving as the barycenter of the wiper motor 100 is fixed. The modular-type wiper apparatus 101 is thus well balanced in weight and is therefore transported easily. The wiper motor 100 applied to the modular-type wiper apparatus 101 does not have the fitting legs 42e (see FIG. 2), and is fixed firmly to the pipe frame 102 with a fitting bracket (not shown). In the other structural aspects, the wiper motor 100 is the same as the wiper motor of the first embodiment.

First and second pivot holders 103a and 103b are fixed to respective ends of the pipe frame 102 in its longitudinal direction, and respectively rotatably support first and second pivots 104a and 104b. To respective base ends of the first and second pivots 104a and 104b, a link mechanism 105 is connected, which transmits the swinging motion of the output shaft 51 to the first and second pivots 104a and 104b. On the front ends of the first and second pivots 104a and 104b, the base ends of the wiper arms 22 and 32 (see FIG. 1) are fixed, respectively. In other words, the link mechanism 105 is disposed between the output shaft 51 and the wiper arms 22 and 32.

The link mechanism 105 is made up of a clank arm 105a fixed to the output shaft 51, a pair of driving levers 105b and 105c fixed to the base ends of the first and second pivots 104a and 104b, respectively, a connecting rod 105d set between the driving lever 105b and the driving lever 105c, and a driving rod 105e set between one driving lever 105c and the clank arm 105a.

Each of the clank arm 105a, driving levers 105b and 105c, connecting rod 105d, and driving rod 105e which make up the link mechanism 105 is formed into a given shape by press working a steel plate. This contributes to an overall weight reduction.

The wiper apparatus of the second embodiment formed in the above manner obtains the same effects as those of the wiper apparatus of the first embodiment.

The present invention is not limited to the above embodiments and may be obviously modified into various forms of applications on the condition that the modification does not deviate from the substance of the invention. According to the first embodiment, the DR-side wiper motor 21 is provided with three fitting legs 42e which are fixed to the vehicle body 10 with fixing bolts, respectively. The present invention, however, offers a different method of fixing the fitting legs 42e. For example, one of the three fitting legs 42e may be provided as an insert-type fitting leg which is inserted in a fixing portion of the vehicle body 10, while the other two fitting legs 42e are fixed to the vehicle body 10 with fixing bolts. In this case, the DR-side wiper motor 21 can be mounted on the vehicle body 10 through a simplified work process and the DR-side wiper motor 21 is positioned certainly relative to the vehicle body 10 without an error.

In the above embodiments, the DR-side wiper motor 21 and the wiper motor 100 function as motors which drive the DR-side wiper arms 22 and the AS-side wiper arms 32 to cause them to swing on the front windshield 11. According to the present invention, however, the DR-side wiper motor 21 and the wiper motor 100 may be adopted as motors which drive wiper arms to cause them to swing on the rear window.

Each of the above embodiments provides the inner-rotor type brushless motor having the rotor 45 placed rotatably inside the stator core 44. The present invention, however, applies also to an outer-rotor type brushless motor having a rotor placed outside a stator core.

What is claimed is:

1. A brushless motor comprising:
a motor unit having a rotating element;
an output shaft which outputs a torque of the motor to outside thereof;
a board having a first surface facing the rotating element and a second surface opposite to the first surface;
a control unit mounted on the board, the control unit controlling rotation of the rotating element;
a first magnet disposed on radial exterior of the rotating element and having a plurality of magnetic poles arranged along a rotation direction of the rotating element;
first and second sensors which are mounted on the first surface, the first and second sensors facing the first magnet and arranged at a given interval along the rotation direction of the rotating element; and
a third sensor mounted on the second surface, the third sensor facing the first magnet and disposed between the first sensor and the second sensor.

2. The brushless motor according to claim 1, wherein the control unit controls rotation of the rotating element on the basis of detection values given by the first to third sensors.

3. The brushless motor according to claim 1, wherein the rotating element has:
a pair of bearings;
a rotating shaft; and
a rotor fixed to the rotating shaft,
wherein a worm gear making up a speed-reducing mechanism and the first magnet are arranged between the pair of bearings arranged along an axial direction of the rotating element,
an axial dimension of the rotor is determined to be shorter than a distance between the pair of bearings,
the motor unit has a stator which generates a driving force to the rotating element, and
a driving unit for supplying a driving current to a plurality of coils wound around the stator is mounted on the second surface.

4. The brushless motor according to claim 3, wherein the brushless motor is applied to a wiper apparatus which causes a wiper to swing.

5. A brushless motor comprising:
a motor unit having a rotating element;
a speed-reducing mechanism which reduces rotating speed of the rotating element;
an output shaft which outputs a torque of the speed-reducing mechanism to outside thereof;
a board having a first surface facing the rotating element and the output shaft and a second surface opposite to the first surface;
a control unit mounted on the board, the control unit controlling rotation of the rotating element;
a first magnet disposed on radial exterior of the rotating element and having a plurality of magnetic poles arranged along a rotation direction of the rotating element;
a second magnet disposed on one end side of the output shaft in its axial direction and having a plurality of magnetic poles arranged along a rotation direction of the output shaft;
first and second sensors which are mounted on the first surface, the first and second sensors facing the first magnet and arranged at a given interval along the rotation direction of the rotating element;
a third sensor mounted on the second surface, the third sensor facing the first magnet and disposed between the first sensor and the second sensor; and
a fourth sensor mounted on the first surface and facing the second magnet.

6. The brushless motor according to claim 5, wherein the control unit controls rotation of the rotating element, based on detection values given by the first to fourth sensors.

7. The brushless motor according to claim 5, wherein the rotating element has a pair of bearings, and
a worm gear making up the speed-reducing mechanism and the first magnet are arranged between the pair of bearings arranged along an axial direction of the rotating element.

8. The brushless motor according to claim 7, wherein the rotating element has a rotating shaft and a rotor fixed to the rotating shaft, and
an axial dimension of the rotor is determined to be shorter than a distance between the pair of bearings.

9. The brushless motor according to claim 5, wherein the motor unit has a stator which generates a driving force to the rotating element, and
a driving unit for supplying a driving current to a plurality of coils wound around the stator is mounted on the second surface.

10. The brushless motor according to claim 5, wherein each of the first to third sensors is a Hall element.

11. A wiper apparatus comprising a brushless motor which causes a wiper to swing, wherein
the brushless motor includes:
a motor unit having a rotating element;
a speed-reducing mechanism which reduces rotating speed of the rotating element;
an output shaft which outputs a torque of the speed-reducing mechanism to outside thereof;
a board having a first surface facing the rotating element and the output shaft and a second surface opposite to the first surface;
a control unit mounted on the board, the control unit controlling rotation of the rotating element;
a first magnet disposed on radial exterior of the rotating element and having a plurality of magnetic poles arranged along a rotation direction of the rotating element;
a second magnet disposed on one end side of the output shaft in its axial direction and having a plurality of magnetic poles arranged along a rotation direction of the output shaft;
first and second sensors which are mounted on the first surface, the first and second sensors facing the first magnet and arranged at a given interval along the rotation direction of the rotating element;
a third sensor mounted on the second surface, the third sensor facing the first magnet and disposed between the first sensor and the second sensor; and
a fourth sensor mounted on the first surface and facing the second magnet.

12. The wiper apparatus according to claim 11, wherein the wiper is fixed to the output shaft.

13. The wiper apparatus according to claim 11, wherein a link mechanism is disposed between the output shaft and the wiper.

14. The brushless motor according to claim 2, wherein the rotating element has:
a pair of bearings;
a rotating shaft; and
a rotor fixed to the rotating shaft,
wherein a worm gear making up a speed-reducing mechanism and the first magnet are arranged between the pair of bearings arranged along an axial direction of the rotating element,
an axial dimension of the rotor is determined to be shorter than a distance between the pair of bearings,
the motor unit has a stator which generates a driving force to the rotating element, and
a driving unit for supplying a driving current to a plurality of coils wound around the stator is mounted on the second surface.

15. The brushless motor according to claim 6, wherein the rotating element has a pair of bearings, and
a worm gear making up the speed-reducing mechanism and the first magnet are arranged between the pair of bearings arranged along an axial direction of the rotating element.

16. The brushless motor according to claim 6, wherein the motor unit has a stator which generates a driving force to the rotating element, and
a driving unit for supplying a driving current to a plurality of coils wound around the stator is mounted on the second surface.

17. The brushless motor according to claim 7, wherein the motor unit has a stator which generates a driving force to the rotating element, and
a driving unit for supplying a driving current to a plurality of coils wound around the stator is mounted on the second surface.

18. The brushless motor according to claim 8, wherein the motor unit has a stator which generates a driving force to the rotating element, and
a driving unit for supplying a driving current to a plurality of coils wound around the stator is mounted on the second surface.

19. The brushless motor according to claim 6, wherein each of the first to third sensors is a Hall element.

20. The brushless motor according to claim 7, wherein each of the first to third sensors is a Hall element.

* * * * *